US007949614B2

(12) United States Patent
Blumberg et al.

(10) Patent No.: US 7,949,614 B2
(45) **Date of Patent: *May 24, 2011**

(54) TWO-STAGE PRINTING OF VALUE INDICIA

(75) Inventors: Stephen L. Blumberg, Waterford, CT (US); David W. Beckstrom, Milford, CT (US); Thomas J. Foth, Trumbull, CT (US); David K. Asano, Easton, CT (US); Ian A. Siveyer, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 718 days.

This patent is subject to a terminal disclaimer.

(21) Appl. No.: 11/415,030

(22) Filed: May 1, 2006

(65) Prior Publication Data

US 2007/0255664 A1 Nov. 1, 2007

(51) Int. Cl.
*G06F 17/00* (2006.01)
*G06K 15/00* (2006.01)
*B41J 3/00* (2006.01)

(52) U.S. Cl. ............................ 705/408; 358/1.12; 347/2

(58) Field of Classification Search .................... 380/51; 705/408; 358/1.12; 347/2

See application file for complete search history.

(56) References Cited

U.S. PATENT DOCUMENTS 4,780,828 A * 10/1988 Whisker ........................ 705/404
5,598,970 A * 2/1997 Mudry et al. ................. 229/305
5,682,504 A * 10/1997 Kimura et al. ................. 358/1.4
5,848,401 A * 12/1998 Goldberg et al. ............. 705/408
6,010,156 A * 1/2000 Block ................................ 281/2
6,147,698 A * 11/2000 Zable et al. .................... 347/240
6,325,505 B1 * 12/2001 Walker ........................... 347/105
6,796,504 B2 * 9/2004 Robinson ................. 235/462.13
6,939,062 B2 * 9/2005 Ogg et al. ......................... 400/62
7,083,345 B1 * 8/2006 Kuwahara .................. 400/615.2
7,243,842 B1 * 7/2007 Leon et al. ..................... 235/381
2002/0033853 A1 3/2002 Aratsu ............................ 347/16
2002/0196457 A1 12/2002 Nunokawa .................. 358/1.13
2003/0140017 A1 * 7/2003 Patton et al. .................. 705/410
2003/0179253 A1 * 9/2003 Manduley ......................... 347/2
2004/0067478 A1 * 4/2004 Epstein ........................... 434/353
2004/0088271 A1 * 5/2004 Cleckler et al. ............... 705/408

(Continued)

FOREIGN PATENT DOCUMENTS

EP 0376575 A2 7/1990

(Continued)

OTHER PUBLICATIONS

Postal Bulletin 22081 (Jul. 25, 2002), p. 76. Article entitled "New Form of PC Postage." Postage Technology Management, Product Development; PC Postage—Stamps.com's NetStamps.

Postal Bulletin 22097 (Mar. 6, 2003), p. 70. Article entitled "NetStamps Update." Postage Technology Management, Product Development, PC Postage—new examples of Stamps.com's NetStamps.

Craig Selig NetStamps—NetStamps price list, from http://www.pnc3.com/cvp/netstamps.htm Accessed on Aug. 15, 2007 (17 pages).

*Primary Examiner* — Fadey S Jabr
(74) *Attorney, Agent, or Firm* — George M. Macdonald; Steven J. Shapiro; Charles R. Malandra, Jr.

(57) ABSTRACT

A method of printing value indicia includes feeding a roll of printing stock into a value indicia printer. The roll of printing stock includes color images pre-printed on the roll of printing stock. The method further includes using the value indicia printer to print value indicia on the roll of printing stock. The printer may be a postage stamp printer which produces custom postage stamps which include pre-printed color images.

8 Claims, 7 Drawing Sheets

U.S. PATENT DOCUMENTS

2004/0101768 A1* 5/2004 Wiliams .......................... 430/22
2004/0254898 A1* 12/2004 Parker et al. .................. 705/402
2005/0071296 A1* 3/2005 Lepkofker .................... 705/410
2005/0201796 A1* 9/2005 Arkin .............................. 400/76
2006/0036347 A1* 2/2006 DeWitt et al. ................. 700/224
2006/0136347 A1* 6/2006 Reichelsheimer et al. ... 705/408
2006/0260753 A1* 11/2006 Crum ............................ 156/387
2008/0024830 A1* 1/2008 Lind et al. ..................... 358/401
2009/0180132 A1* 7/2009 Meyerhofer et al. ........ 358/1.12

FOREIGN PATENT DOCUMENTS

JP 2001 180058 7/2001
WO 99/66456 12/1999
WO 01/35346 A2 5/2001

* cited by examiner

TWO-STAGE PRINTING OF VALUE INDICIA

CROSS-REFERENCE TO RELATED APPLICATION

This application is related to application Ser. No. 11/415,307, entitled "Apparatus and Materials for Two-Stage Printing of Value Indicia" and filed contemporaneously herewith, which related application is incorporated herein by reference in its entirety.

BACKGROUND

This invention relates generally to printing of value indicia, and more particularly to operation of personal postage stamp printers.

Personal postage stamp printers have been proposed. With such printers, postal customers, after prepayment of postage, may be allowed to print adhesive postage stamps. According to some proposals, the postal customers may be permitted to create or supply a custom image to be incorporated as part of the postage stamps.

To achieve widespread acceptance of personal postage stamp printers, it may be desirable that the cost of the devices be kept very low. Consequently, it may be desirable that personal postage stamp printers incorporate a low cost printing technology, such as black and white thermal printing. However, prospective customers may find the concept of personal stamp printing more attractive if the stamps they produce were to include color images.

SUMMARY

A method of printing value indicia includes feeding a roll of printing stock into a value indicia printer. The roll of printing stock includes color images pre-printed on the roll of printing stock. The method further includes using the value indicia printer to print value indicia on the roll of printing stock.

The value indicia may be postage indicia, printed on the roll of printing stock to form postage stamps. The value indicia printer may be a postage indicia printer or "stamp printer".

The postage indicia printer may employ thermal printing to print the postage indicia on the roll of printing stock.

A first one of the postage indicia printed on the roll of printing stock may be for a first postage amount, and a second one of the postage indicia printed on the roll of printing stock may be for a second postage amount that is different from the first postage amount. Thus the printer may print stamps of varying denominations on the same roll.

At least one of the pre-printed color images may be different from at least one other of the pre-printed color images. Thus various different pre-printed images may be provided on the same roll of printing stock.

Each of the pre-printed color images may have associated with it a respective space for printing a respective postage indicia in the respective space. The method may further include feeding the roll of printing stock such that a first one of the spaces passes a print head of the postage indicia printer without printing a postage indicium in the first one of the spaces and thereafter printing a postage indicium in a second one of the spaces.

The method may further include, after printing the postage indicium in the second one of the spaces, reverse feeding the roll of printing stock to bring the first one of the spaces back to the print head and printing a postage indicium in the first one of the spaces.

The method may further include printing, on the roll of printing stock, a return address of a user of the postage indicia printer.

In another aspect, a method of printing value indicia includes receiving, in a value indicia printer, loading of a first roll of printing stock. The method further includes detecting that the first roll of printing stock loaded in the value indicia printer is of a first type, and responding to the detection that the first roll of printing stock is of the first type by printing, with the value indicia printer, images on the first roll of printing stock together with value indicia information to produce value indicia with the images thereon. The method further includes receiving, in the value indicia printer, loading of a second roll of printing stock, and detecting that the second roll of printing stock is of a second type different from the first type. The method further includes responding to the detection that the second roll of printing stock is of the second type by printing, with the value indicia printer, value indicia information on the second roll of printing stock, without printing images on the second roll of printing stock by the value indicia printer. The second roll of printing stock includes pre-printed images to provide decorative images for the value indicia printed on the second roll of printing stock. The pre-printed images had been printed on the second roll of printing stock before the second roll of printing stock is loaded in the value indicia printer.

Accordingly, a value indicia printer (e.g., a personal stamp printer) may be operable with two different types of stamp printing stock. One type may bear pre-printed decorative color images, and the stamps may be completed by the stamp printer printing postage indicia information (e.g., numerals indicating the postage denomination and a conventional two-dimensional barcode of the type prescribed by some postal authorities) in association with each of the pre-printed decorative color images. The other type of stamp printing stock may be blank or substantially blank, lacking pre-printed decorative images, and the stamp printer may print complete stamps, including a black and white thermal-printed image together with the postage indicia information.

The stamp printer may print on a first side of the rolls of printing stock and the detecting of the type of the rolls of printing stock may include the stamp printer reading control indicia on the opposite side of the rolls of printing stock. The control indicia may be pre-printed bars on the opposite side of the rolls of printing stock. Thus the control indicia may be used to control whether the stamp printer prints full postage stamps including decorative images or alternatively prints only postage indicia information to complete stamps that include pre-printed color images.

In some embodiments, the stamp printer may print the return address of the user or holder of the stamp printer and/or some or all of the rolls of printing stock may come with such a return address pre-printed thereon.

In another aspect, a method includes printing images on a roll of printing stock if the printing stock is detected to be of a first type, and refraining from printing images of the roll of printing stock if the printing stock is detected to be of a second type different from the first type.

The method may also include printing value indicia information, such as postage indicia information, on the roll of printing stock. In addition or alternatively, the method may include printing, on the roll of printing stock, a return address of a user or holder of the stamp printer.

In another aspect, a method of printing a postage stamp includes pre-printing images on printing stock, and thereafter feeding the printing stock into a stamp printer and using the stamp printer to print postage indicia information on the printing stock. The printing stock is in the form of a roll or a single label.

The method may further include the stamp printer receiving authorization from a data center to print the postage indicia information. The authorization may occur after the pre-printing of the images and before the printing of the postage indicia information.

The pre-printing of the images may be by off-set or inkjet printing, and may be in color (e.g., four color printing). The stamp printer may print the postage indicia information by thermal printing.

In another aspect, a method includes providing printing stock which bears pre-printed color images and thermally printing postage indicia on the printing stock.

The postage indicia may be printed one-by-one by a stamp printer, and at least one of the pre-printed color images may be different from at least one other of the pre-printed color images.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in its various aspects, facilitates a program to allow individual postal patrons to print (or complete the printing of) their own custom designed postage stamps including color illustrations. Alternatively, the postal patrons may choose from among standard color images to be included in the stamps they print. Pre-printed rolls of postage stamp printing stock are delivered to the postal patrons. The rolls of postage printing stock include color images. Finished postage stamps are printed by the postal patrons using their personal postage stamp printers to print postage indicia information on the rolls of postage printing stock. The personal postage stamp printers employ a relatively inexpensive printing technology such as thermal printing. The resulting postage stamps may be highly attractive because of the inclusion therein of the pre-printed color images. At the same time, the postal patrons enjoy the convenience and other advantages of personal stamp printing.

Figure 1:
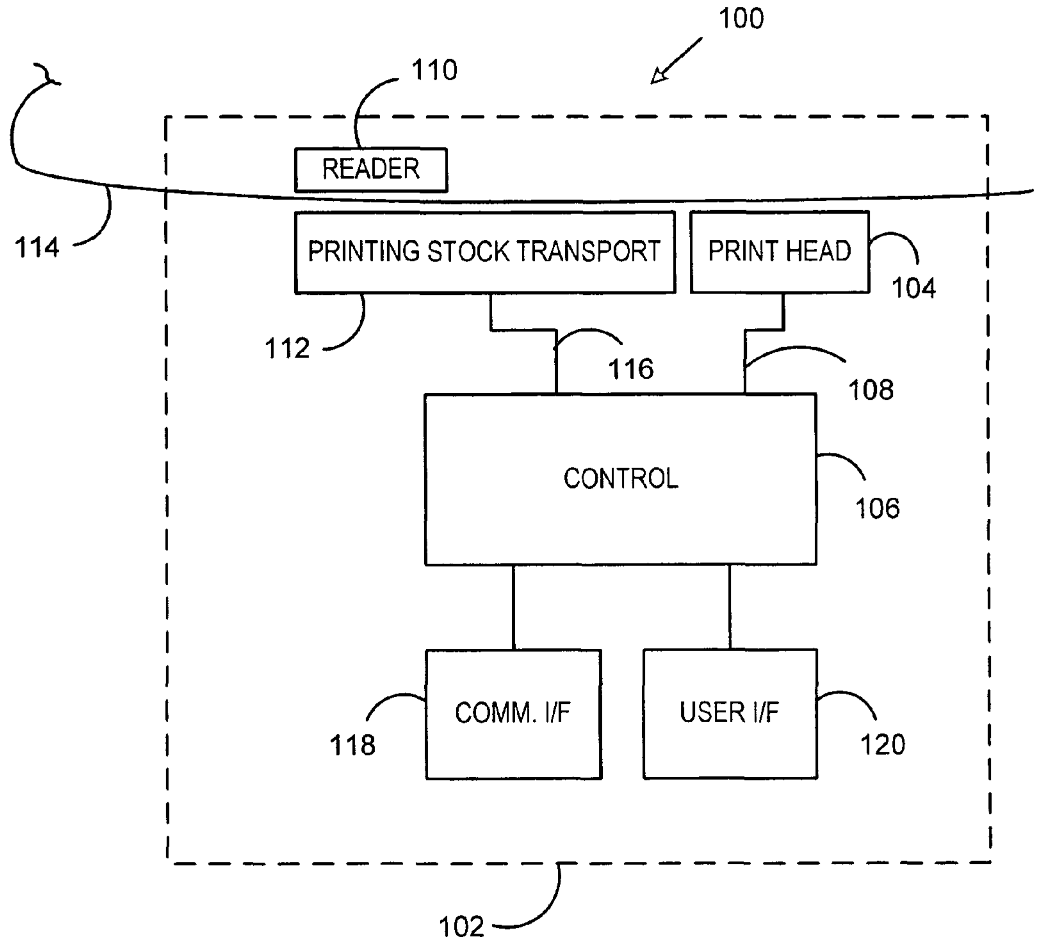
FIG. 1 is a partially-block, partially-schematic illustration of a stamp printer provided in accordance with aspects of the invention.

FIG. 1 is a partially-block, partially-schematic illustration of a stamp printer 100 provided in accordance with aspects of the invention.

The stamp printer 100 includes a housing (schematically indicated at 102). The housing 102 may be of molded plastic or other conventional construction, and may include a separate base, which is not shown. Also included in the stamp printer 100 is a thermal print head 104. The thermal print head 104 may be constructed and may perform printing operations in accordance with conventional principles, except that the manner in which the thermal print head 104 is controlled may, in accordance with aspects of the invention, differ from conventional practices.

The stamp printer 100 further includes a control device 106 that is in the housing 102 and is connected by signal path or paths 108 to the print head 104. The control device 106 may be microprocessor- or microcontroller-based, and thus may include a microprocessor (not separately shown) or a microcontroller (not separately shown) together with memory (not separately shown) to store software and/or firmware to control the microprocessor or microcontroller. The memory may serve as working memory as well as program memory and/or additional working memory/data storage memory may be provided as part of the control device 106. The software/firmware may include program instructions to control the control device 106 to operate in accordance with at least some aspects of the invention, as described herein. As will be seen, the control device 106 is operative to control the thermal print head 104. The memory included in the control device 106 may, in some embodiments, store bit map or other image(s) to be printed on one type of stamp printing stock that may be used with the stamp printer 100.

In addition, the stamp printer 100 also includes a reader 110 that is in the housing 102 and is connected with the control device 106 by one or more signal paths (not shown, to simplify the drawing). As described further below, the reader 110 is operative to read bars or other control indicia printed on the reverse side of rolls of stamp printing stock to be printed on by the stamp printer 100. The reader 110 is also operative to provide to the control device 102 indications of the control indicia read by the reader 110.

Still further, the stamp printer 100 includes a transport mechanism 112 that is also at least partially in the housing 102. The transport mechanism 112 is provided to receive a roll of printing stock (shown schematically at 114) and to transport the roll of printing stock 114 past the reader 110 and the thermal print head 104, so that the former can read, and the latter can print on, the roll of printing stock 114. One or more signal paths 116 operatively couple the transport mechanism 112 to the control device 106 to allow the control device 106 to control the transport mechanism 112.

The stamp printer 100 also includes a communication interface 118 that is operatively coupled to the control device 106. The communication interface 118 allows the control device to be in communication, at least from time to time, with external devices. Such external devices may include a data center (not shown in FIG. 1) from which the stamp printer 100 may receive authorization to print postage stamps. Such external devices may also or alternatively include a personal computer ("PC"; not shown in FIG. 1) by which a user/holder of the stamp printer 100 may communicate with the stamp printer 100. The communication interface may be partly or entirely within the housing 102 of the stamp printer 100.

The stamp printer 100 may further include a user interface, schematically represented at 120. The user interface allows the user to interact with the stamp printer 100 and may include one or more displays, push buttons, a touch screen, etc. (all of which are not separately shown). In some embodiments, the user interface 120 may be dispensed with, and all interaction between the user and the stamp printer 100 may be via a PC (not shown in FIG. 1) that is in communication with the control device 106 of the stamp printer 100 via the communication interface 118.

Figure 2:
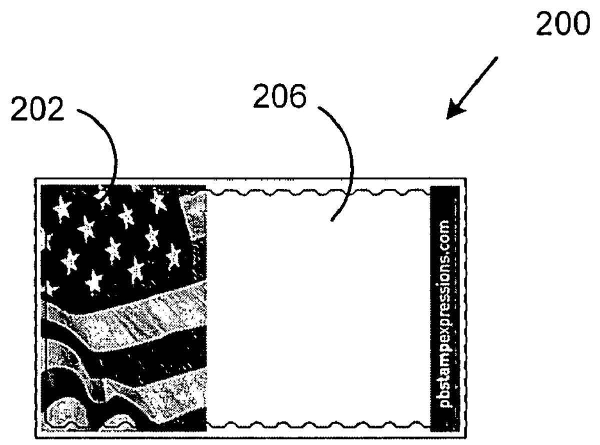
FIG. 2 illustrates a pre-printed postage stamp blank shown in isolation from a roll of stamp printing stock of which it is a part.

FIG. 2 illustrates a pre-printed postage stamp blank 200 shown in isolation from the roll of stamp printing stock 114, the postage stamp blank 200 being part of the roll of stamp printing stock 114. The same postage stamp blank 200 is illustrated in schematic terms in FIG. 3. It will be understood that the roll of stamp printing stock 114 includes many such postage stamp blanks held sequentially on a backing, which is not shown in FIG. 2. In some embodiments, the postage stamp blank includes a pressure sensitive adhesive that is exposed when the blank is removed from the backing.

Figure 3:
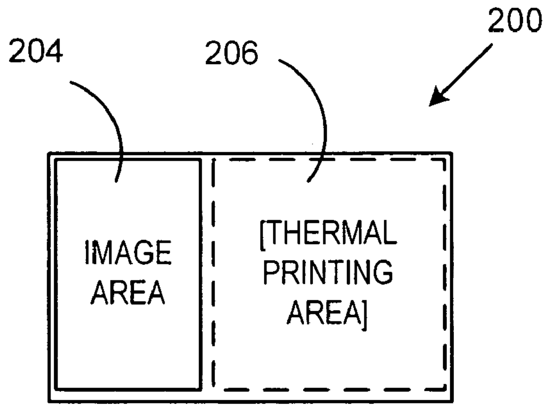
FIG. 3 is a schematic representation of the postage stamp blank of FIG. 2.

The postage stamp blank 200 includes a pre-printed color image 202 (FIG. 2) in an image area 204 (FIG. 3). The pre-printed color image may have been printed by a printing process such as offset printing or inkjet printing and may have been produced by four-color printing.

The postage stamp blank 200 also includes a blank area 206 that is suitable for black and white thermal printing. The purpose of the blank area 206 is to receive the postage indicia information (such as denomination amount, 2-D barcode such as an IBIP—"Information Based Indicia Program"—barcode) to complete the printing of the stamp. The blank area may be suitably treated so as to support thermal printing thereon. Alternatively, the entire stock front surface may initially have been suitable for thermal printing, and the image area may thereafter have been suitably treated before pre-printing of the image 202, such that satisfactory off-set or inkjet printing of the image 202 in the image area could be achieved in the image area 204. In accordance with conventional practices, the blank area 206 may be framed with a fluorescent border, or a thermal emulsion in the blank area 206 may have fluorescent material embedded in it. In addition or alternatively, at least one ink used in printing the image 202 may be fluorescent.

Figure 4:
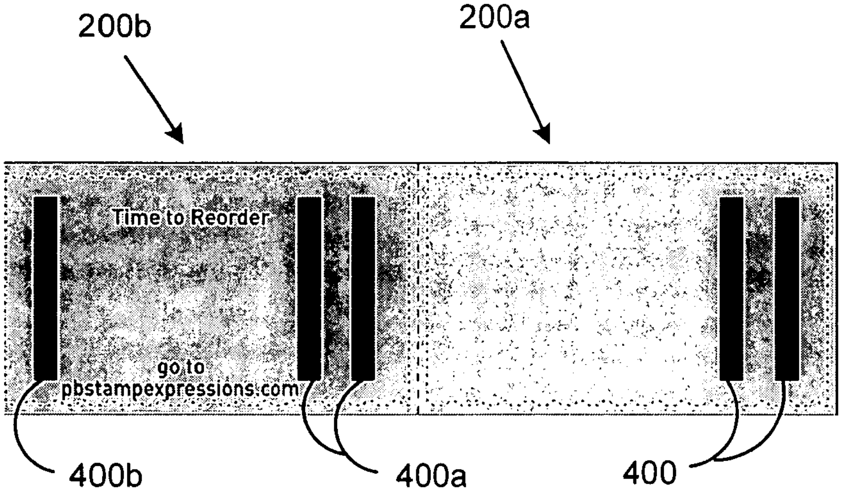
FIG. 4 shows the reverse side of two connected postage stamp blanks like the postage stamp blank of FIG. 2.

FIG. 4 shows the reverse side of two connected postage stamp blanks 200*a*, 200*b*, which have front sides (not shown) that may be identical to the front side of postage stamp blank 200 shown in FIG. 2. (In particular, the reverse side of the backing is shown in FIG. 4.) The reverse side of postage stamp blank 200*a* has printed thereon two bars 400 spaced a short distance (e.g., about the width of the bars) apart from each other. Each bar 400 may be similar to an individual timing mark (not separately shown) previously proposed to indicate to the stamp printer a timing at which printing is to occur on stamp printing stock. The presence of the two bars 400 indicates that the printing stock is of a type which includes a pre-printed image, so that only the postage indicia information needs to be printed on the front surface of the stamp blank (i.e., in the blank area 206, FIGS. 2 and 3) in order to complete the stamp. Accordingly, the bars 400 may function as control indicia to control the stamp printer to print in a certain manner on the front side of the stamp blank.

The reverse side of postage stamp blank 200*b* includes two bars 400*a* which are the same in configuration and position relative to the blank 200*b* as the bars 400 are relative to the blank 200*a*. In addition the reverse side of postage stamp blank 200*b* includes a third bar 400*b* at the opposite end of the stamp blank (i.e., spaced rather far from the bars 400*a*). The third bar 400*b* may serve as an end-of-roll or near-end-of-roll) indicator to the stamp printer 100. In response to detecting the third bar 400*b*, the stamp printer 100 may communicate with the PC (not shown in FIG. 1) to prompt the user to order a new roll of stamp printing stock. In addition, or alternatively, detection of the end-of-roll indicator may cause the stamp printer to cause a light to flash on the stamp printer or may provide another indication to the user that the end of the roll has been reached.

Figure 5:
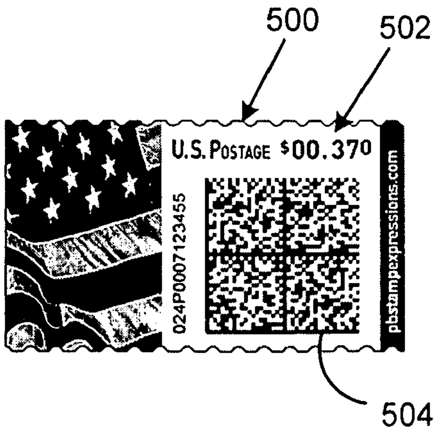
FIG. 5 shows the postage stamp blank of FIG. 2, after printing thereon of postage indicia information to produce a completed postage stamp.

FIG. 5 shows the postage stamp blank 200 of FIG. 2, after printing thereon of postage indicia information 500 to produce a completed postage stamp. It will be noted that the postage indicia information 500 includes numerals 502 that indicate the denomination of the stamp, as well as an IBIP two-dimensional bar code 504. It will also be noted that the postage indicia information 500 has been printed in the formerly blank area 206 shown in FIGS. 2 and 3.

Figure 6:
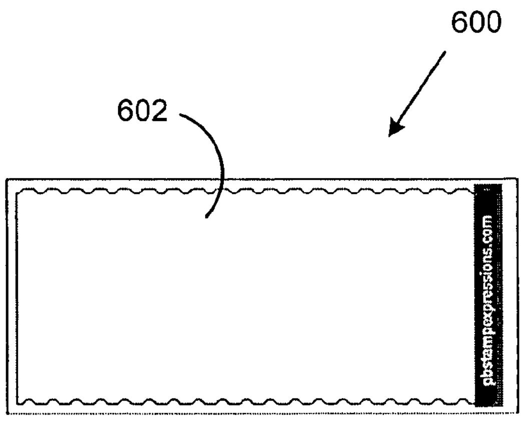
FIG. 6 illustrates another type of postage stamp blank, also shown in isolation from a roll of stamp printing stock of which it is a part.

FIG. 6 illustrates another type of postage stamp blank (generally indicated by reference numeral 600), also shown in isolation from a roll of stamp printing stock of which it is a part. Most of the front side (visible in FIG. 6) of the postage stamp blank 600 is a blank area 602, suitable for thermal printing. (In some embodiments, all of the front surface of the roll of printing stock of which the blank 600 is a part may be suitable for thermal printing.) It will be observed that the blank area 602 of postage stamp blank 600 is much larger than the blank area 206 (FIG. 2) of postage stamp blank 200. The larger size of blank area 602 is to accommodate a decorative image to be thermally printed on the blank 600 by the stamp printer 100 in addition to accommodating the same type of postage indicia information as was seen in the completed stamp of FIG. 5.

Figure 7:
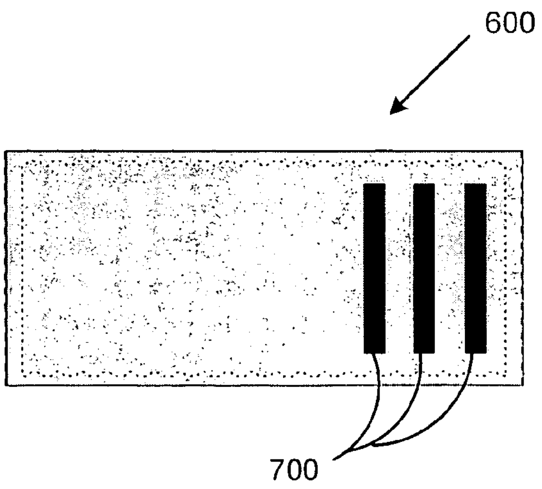
FIG. 7 shows the reverse side of the postage stamp blank of FIG. 6.

FIG. 7 shows the reverse side of the postage stamp blank 600 of FIG. 6. (Again, the reverse side of the backing is shown in FIG. 7.) The reverse side of postage stamp blank 600 has printed thereon three bars 700 rather closely spaced relative to each other (e.g., with a distance between adjacent bars about equal to the width of the bars). Each individual one of the bars 700 may be the same in size and configuration as the bars 400 shown in FIG. 4. The presence of the three bars 700 indicates to the stamp printer 100 that the printing stock of which the postage stamp blank 600 is a part does not include a pre-printed image, and is configured to accommodate a decorative image to be printed by the stamp printer 100. Thus bars 700 also serve as control indicia.

Figure 8:
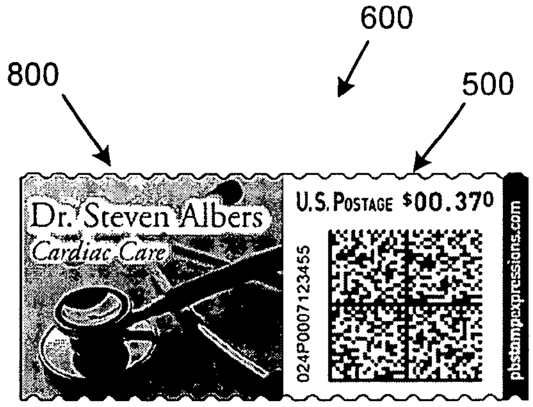
FIG. 8 shows the postage stamp blank of FIG. 6, after printing thereon by a postage stamp printer of a decorative black and white image together with postage indicia information to produce a postage stamp.

FIG. 8 shows the postage stamp blank 600 after printing thereon by the stamp printer 100. In addition to printing postage indicia information 500 as in the case of postage stamp blank 200, the stamp printer 100 also thermally prints a black and white decorative image 800.

Figure 9:
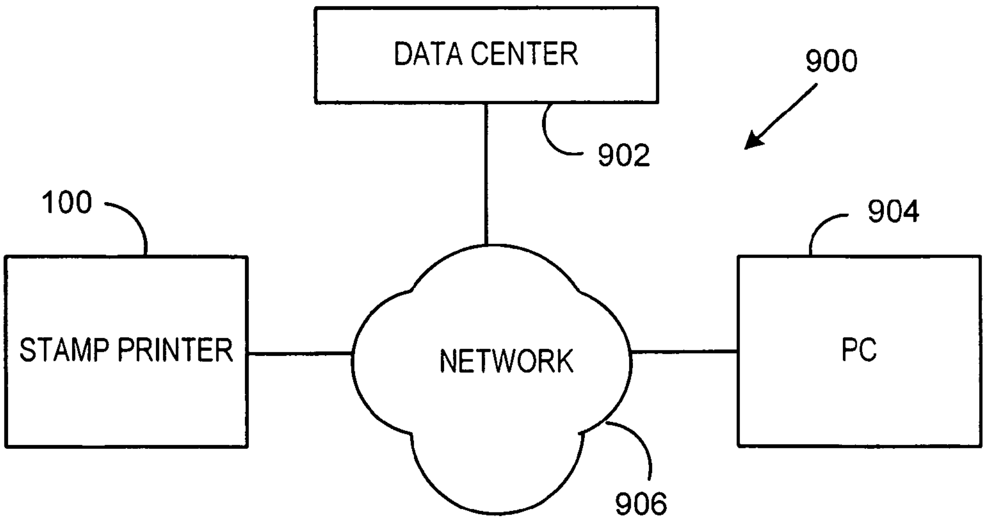
FIG. 9 is a block diagram of a data-exchange arrangement that includes the stamp printer of FIG. 1.

FIG. 9 is a block diagram of a data-exchange arrangement 900 that includes the stamp printer 100. As shown in FIG. 9, the data exchange arrangement 900 includes a data center 902, and PC 904 and a network 906 by which the stamp printer 100 is connected (at least from time to time) to either or both of the data center 902 and the PC 904. The connection between the data center 902 and the stamp printer 100 allows the stamp printer to request and receive from the data center 902 authorization to print one or more postage stamps. The connection between the stamp printer 100 and the PC 904 may allow a user (not shown) to interact with the stamp printer 100 via the PC 904 and/or may allow for control of the stamp printer 100 by the PC 904. In some embodiments there may also be exchange(s) of data between the PC 904 and the data center 902. It will be appreciated that the data connections among the stamp printer 100, the data center 902 and the PC 904 may be provided in a manner that is different from that illustrated in FIG. 9.

In some embodiments, a roll of postage printing stock may contain more than one type of pre-printed color image. That is, images of two or more different appearances may be provided in the same roll of postage printing stock. The different images may appear in a repeating sequence along the roll. For example, flag images may alternate with Statue of Liberty images, or may form a repeating sequence of a flag image, a Statue of Liberty image and a Mount Rushmore image. Four or more different images may also be provided on one roll. The images may be selected/supplied by the postal patron who orders the roll of postage printing stock. For example, the pre-printed images may reflect one or more photographs taken by the postal patron.

Figure 10:
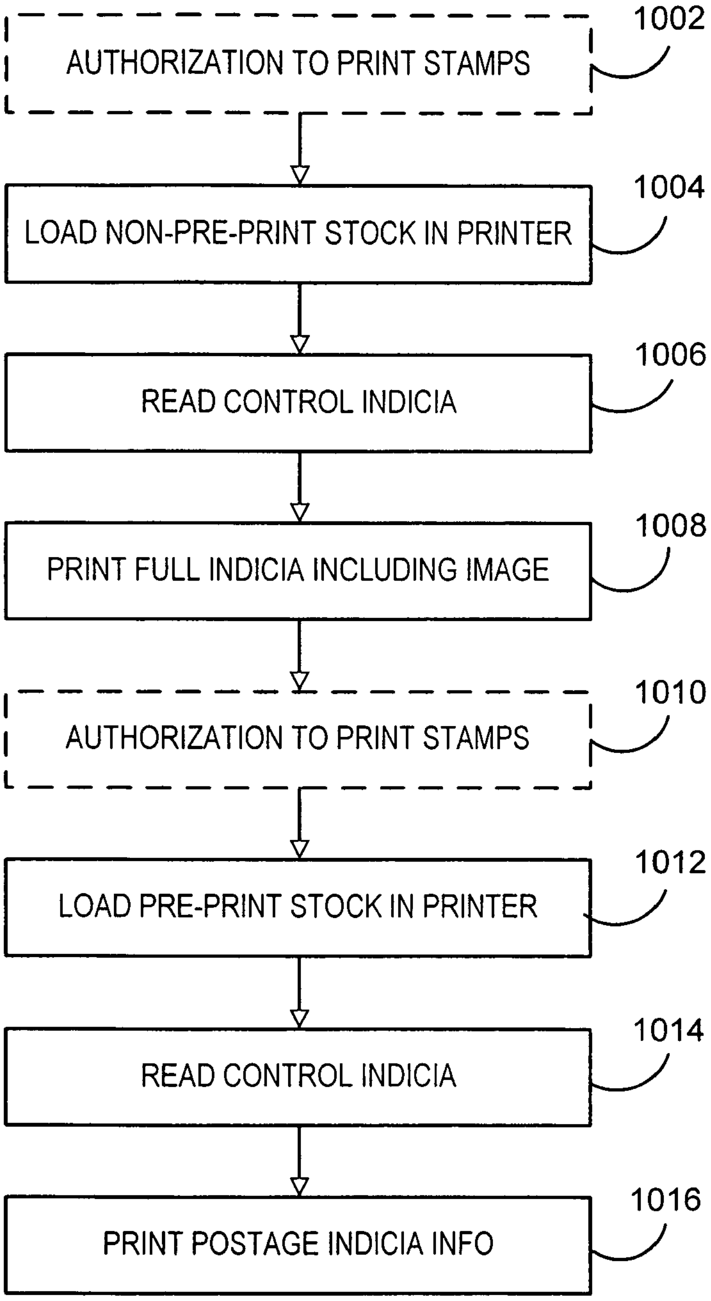
FIG. 10 is a flow chart that illustrates a process that may be performed by the stamp printer of FIG. 1.

FIG. 10 is a flow chart that illustrates a process that may be performed by the stamp printer 100.

Assuming that the stamp printer 100 had not previously been authorized to print stamps (or that all stamps previously authorized had already been printed), at 1002 in FIG. 10 the stamp printer 100 may engage in a procedure to receive authorization from the data center 902 to print postage stamps. The procedure may be in accordance with techniques that have previously been proposed. For example, the data center 902, in response to a request from the stamp printer 100 or from the PC 904, and after securing payment for the postage stamps to be printed (and possibly after receiving a fee as well), may authorize the stamp printer 100 to print 18 stamps denominated at 39 cents, plus 2 stamps denominated at $1.59.

At 1004, the user loads (feeds) a roll of postage stamp printing stock into the stamp printer 100. For the purposes of the present example, it is assumed that the printing stock loaded at this step is not pre-printed with decorative images; that is, it is assumed that the postage stamp blanks carried on the roll of printing stock are of the type shown in FIGS. 6 and 7 (for example). It will be appreciated that loading/feeding of the roll of printing stock may require operation of the transport mechanism 112 (FIG. 1), under the control of the control device 106.

Referring once more to FIG. 10, at 1006, the reader 110 (FIG. 1) reads the control indicia on the reverse side of the roll of printing stock (e.g., bars 700, FIG. 7) and provides an indication of the control indicia to the control device 106. From this indication, the control device 106 may determine that the roll of printing stock now in the stamp printer 100 is of a type which is not pre-printed with decorative images. Accordingly, as indicated at 1008 in FIG. 10, the control device 106 may control the print head 104 to thermally print (e.g., in black and white) on the next postage stamp blank 600 (FIGS. 6-8) a full stamp indicium, including a decorative image 800 (FIG. 8) together with the postage indicia information 500. It may be assumed that data which represents the image 800 was previously downloaded to the stamp printer 100 from the data center 902 or otherwise loaded into the stamp printer 100.

It may next be assumed that the non-pre-printed roll of postage stamp stock is exhausted and/or that further authorization for stamp printing by the stamp printer occurs (step 1010, FIG. 10). At 1012, the user loads/feeds a second roll of postage stamp printing stock into the stamp printer 100. It is now assumed that the roll of printing stock loaded at step 1012 carries postage stamp blanks of the type shown in FIGS. 2-4; in other words, the roll of printing stock now loaded is pre-printed with decorative color images, which need not all be identical. As before, the loading/feeding of the second roll of printing stock may require operation of the transport mechanism 112 under the control of the control device 106.

Referring again to FIG. 10, at 1014, the reader 110 reads the control indicia on the reverse side of the second roll of printing stock and provides an indication of the control indicia to the control device 106. From this indication, the control device 106 may determine that the second roll of printing stock is of the type that is pre-printed with (e.g., color) images. Accordingly, as indicated at 1016, the control device 106 may control the print head 104 to thermally print (e.g., in black and white) in the blank area (FIGS. 2 and 3) of the next postage stamp blank 200 the postage indicia information 500, while refraining from printing any decorative image on the stamp blank 200. The resulting finished stamp is shown in FIG. 5.

By operating in accordance with the process of FIG. 10, the stamp printer 100 may operate as a "dual use" device, in that it can print both postage stamps that incorporate pre-printed decorative (e.g. color) images as well as postage stamps that includes decorative images (e.g. black and white) produced by the stamp printer itself. In other words, the stamp printer is able to operate satisfactorily with both the type of stamp printing stock illustrated in FIGS. 2-4 and with the type of stamp printing stock illustrated in FIGS. 6 and 7.

Figure 11:
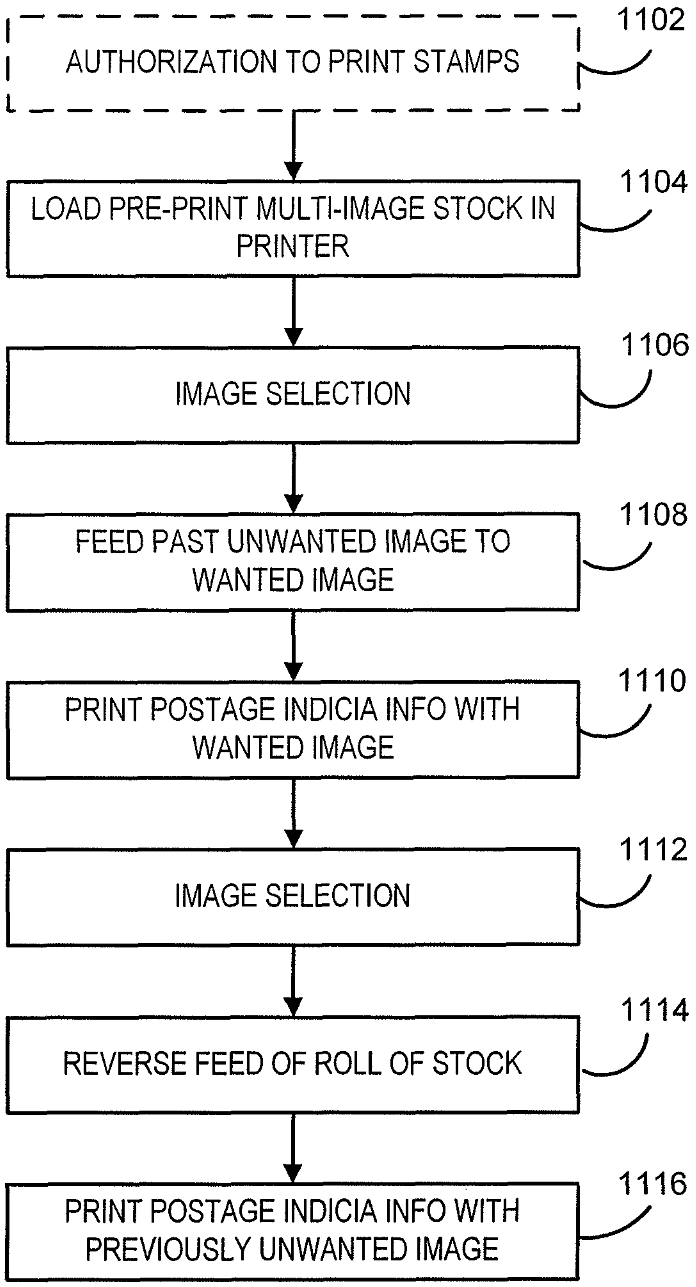
FIG. 11 is a flow chart that illustrates another process that may be performed by the stamp printer of FIG. 1.

FIG. 11 is a flow chart that illustrates another process that may be performed by the stamp printer 100.

At 1102 in FIG. 11 the stamp printer 100 may engage in a procedure to receive authorization from the data center 902 to print postage stamps (assuming such authorization had not already been received). Then, at 1104, the user loads (feeds) a roll of postage stamp printing stock into the stamp printer 100. For the purposes of the example of FIG. 11, it is now assumed that the printing stock loaded at this step is pre-printed with images (e.g., color) that are not all identical to each other. As in similar steps discussed in connection with FIG. 10, the loading/feeding of the roll of printing stock may require operation of the transport mechanism 112 (FIG. 1), under the control of the control device 106.

Since the printing stock includes two or more different pre-printed images that are different in appearance with each other (e.g., flag images interspersed with Statue of Liberty images; or depictions of George Washington interspersed with depictions of Abraham Lincoln) the user may wish to select the pre-printed image that is to be part of the next postage stamp to be printed by the stamp printer 100. Selection of the pre-printed image is indicated at 1106 in FIG. 11. In some embodiments, the user may interact with the PC 904 (FIG. 9) to select the desired image, and the PC 904 may issue a command or commands to the stamp printer 100 to implement the selection made by the user. For example, the stamp printer may, via the reader 110, read control indicia or other information from the roll of postage stamp stock loaded in the stamp printer to determine which images are on the roll of postage stamp stock and in which locations. (Alternatively, this information may be entered into the PC 904 by the user—e.g., by entering into the PC 904 a unique identification number for the roll of postage stamp stock—and/or the information about which images are on the roll of stock and where may be downloaded to the PC 904 from the data center 902 or from another source, such as a server maintained by the entity which pre-printed the images on the postage stamp stock.) In any event, once the PC has the information concerning what images are on the roll of postage stamp stock, it may display to the user (via a display screen which is not separately shown) the various images (e.g., in "thumbnail" form) available on the roll of postage stamp stock loaded in the stamp printer 100. The user may indicate selection of a particular one of the images by "clicking" on the desired "thumbnail" with a mouse/cursor arrangement of a graphical user interface provided by the PC 904. Assuming that the PC has information indicative of where the next matching pre-printed image is on the roll of postage stamp stock, the PC may command the stamp printer 100 to advance (feed) the roll of stock to the desired image (if the desired image is not already available at the print head 104). Alternatively, the stamp printer 100 may have stored therein information indicative of where on the roll of printing stock the various images are, and may merely receive from the PC an identifier for the desired image. The stamp printer may then feed the roll of printing stock as needed to reach the desired image. It will be appreciated that either one or both of the stamp printer and the PC may keep track of the number of postage stamp blanks on the roll of postage stamp blanks that have already been printed on or fed past the print head without printing. In other words, either or both of the stamp printer and the PC may track what location (which postage stamp blank) on the roll of printing stock is currently at the print head, along with tracking which blanks have already been printed on to produce finished stamps. In addition or alternatively, the user may interact with a user interface on the stamp printer to select a particular postage stamp blank for printing, thereby selecting a particular pre-printed image for the next postage stamp to be printed by the stamp printer. In addition or alternatively, each stamp blank may carry fluorescence, and the stamp printer may detect the presence of a stamp blank on the backing of the printing stock by detecting the presence of fluorescence.

For the purposes of the particular example illustrated in FIG. 11, it is assumed that the desired image selected by the user is not on the next postage stamp blank currently positioned for printing by the print head 104. Accordingly, and as indicated at 1108, the stamp printer operates to advance the next postage stamp blank (and possibly one or more other blanks as well) past the print head until the stamp blank with the desired image is brought to the print head. That is, the control device 106 may control the transport mechanism 112 to feed the roll of postage stamp stock in the manner described in the previous sentence. Then, as indicated at 1110, the control device 106 may control the print head 104 to print the required postage indicia information 500 in the blank area 206 (FIGS. 2 and 3) of the postage stamp blank 200 that includes the desired image. The postage indicia information may reflect a stamp denomination selected by the user. In this way, a finished stamp is produced that includes both the pre-printed image selected by the user as well as, potentially, a postage denomination selected by the user.

For the purposes of the example illustrated in FIG. 11, it is next assumed that the user selects another image (at 1112 in FIG. 11), which is carried on a postage stamp blank that was previously fed past the print head and which has not previously been printed on by the stamp printer. Consequently, it is necessary, or at least desirable, for the stamp printer to reverse-feed (step 1114) the roll of printing stock to bring the stamp blank which carries the now-desired image back to the print head. The control device 106 may control the transport mechanism 112 accordingly. Then, as indicated at 1116, the control device 106 may control the print head 104 to print the required postage indicia information 500 in the blank area 206 of the postage stamp blank (previously fed past the print head and then reverse-fed back to the print head) which carries the pre-printed image selected at 1112.

With the process described in FIG. 11, the stamp printer (and possibly the PC in combination with the stamp printer) may virtually provide the user with "random access" to any pre-printed image on the roll of postage stamp stock, by advancing and/or reverse feeding the roll of postage stamp stock. As a result, the user may be able to freely select for inclusion, in the next stamp printed by the stamp printer, any one of the various pre-printed images carried on a multi-image pre-printed roll of postage stamp stock.

It should be understood that the processes described above in connection with FIGS. 10 and 11 are not mutually exclusive and indeed may be combined together in a single process. Moreover, the illustrations of FIGS. 10 and 11 and the above descriptions are not meant to imply a fixed order for performing the process steps; rather the steps may be performed in any order that is practicable. For example, steps 1012-1016 of FIG. 10 may be performed prior to steps 1004-1008. Further, the loading of a roll of stamp printing stock into the stamp printer may take place before the stamp printer receives authorization from the data center for the stamps to be printed on the roll of printing stock. One authorization step may be performed to authorize printing of stamps on two or more rolls of printing stock and/or more than one authorization step may be performed for printing of stamps from a single roll of printing stock.

Although not shown in the drawings, the postage stamp printing stock may be modified to include an additional blank space to receive printing by the stamp printer of a return address of a user and/or holder of the stamp printer. Concomitantly, the postage stamp printer may operate to print a user's/holder's return address on the postage stamp printing stock along with the postage indicia information (and also with a decorative image, in cases where the printing stock is not of the type that has pre-printed color images).

In some embodiments, the user's/holder's return address may be pre-printed on the postage stamp printing stock. In some embodiments, the stamp printer may read control indicia on the reverse side of the printing stock to determine whether the printing stock carries a pre-printed return address. If not, the stamp printer may print the return address on the printing stock, as described in the previous paragraph. If the printing stock carries the pre-printed return address, the stamp printer refrains from printing the return address on the printing stock.

The stamp printer 100 described above is a "dual use" device in that it is operable both with pre-printed and non-pre-printed postage stamp printing stock. However, in other embodiments, the stamp printer may operate only to complete stamps for which decorative images are pre-printed on the postage stamp printing stock. In either case, it is not required that the pre-printed images be in color.

The postage stamp printing stock described above is in the form of a continuous roll. However, in other embodiments, single labels each with a pre-printed color image thereon may be used for printing postage stamps. Such labels may be used in conjunction with a stamp printer similar to the stamp printer 100 described above, but adapted to operate with single labels. In addition, or alternatively, single labels each with a pre-printed color image thereon may be printed with postage indicia information with a device similar to a conventional postage meter.

In some embodiments, the control indicia may guide the stamp printer in regard to decisions besides whether or not to print a decorative image. For example, the control indicia may also or alternatively guide the stamp printer as to the location(s) and/or dimensions and/or print head power settings with which postage indicia information and/or decorative images are to be printed by the stamp printer.

In some embodiments, the required postage indicia information may be printed on the postage stamp printing stock at a kiosk rather than by a personal postage stamp printer. Accordingly, the postal patron may obtain desired postage stamp printing stock (including pre-printed color images) from a printing company, and may bring the printing stock to a kiosk. At the kiosk, the user may feed the printing stock-into a printing module of the kiosk and may pay for desired postage (e.g., by credit/debit card submitted by the postal patron for reading by the kiosk). The kiosk then prints on the printing stock to produce finished postage stamps with images that were previously selected by the postal patron in obtaining the printing stock.

In other embodiments, the postal patron obtains the postage stamp printing stock with desired pre-printed images from the printing company, and then goes to a post office window. The postal service window clerk then receives payment from the postal patron and operates a printer at the window to convert the postage stamp printing stock into finished postage stamps. In still another embodiment, a commercial vendor may be authorized by the postal authorities to receive payment for postage and to convert postage stamp printing stock presented by a postal patron into finished stamps at a point of sale.

In some embodiments, at least a portion of the control indicia may be on the front side of the printing stock rather than on the reverse side. The control indicia may take a form other than or in addition to the bars illustrated in the drawings. In some embodiments, control indicia may appear on the front side of the printing stock in the form of tick marks along a side of a pre-printed image, as special fluorescent ink, or as colored inks in specific locations on or along the side of a pre-printed image.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method of printing value indicia, the method comprising:

feeding a roll of printing stock into a value indicia printer, the roll of printing stock including images pre-printed on the roll of printing stock; and using the value indicia printer to print value indicia on the roll of printing stock, wherein the value indicia are postage indicia, printed on the roll of printing stock to form postage stamps, and the value indicia printer is a postage indicia printer, wherein each of said pre-printed images has associated therewith a respective space for printing a respective postage indicia in the respective space including at least a first one and a second one of said spaces; the method further comprising:

obtaining an indication from a user to select the second one of said spaces;

feeding the roll of printing stock such that the first one of said spaces passes a stationary print head of the postage indicia printer without printing a postage indicium in said first one of said spaces and thereafter printing a first postage indicium in the second one of said spaces, and after printing said first postage indicium in said second one of said spaces, reverse-feeding the roll of printing stock to bring said first one of said spaces back to said stationary print head and thereafter printing a second postage indicium in said first one of said spaces.

2. The method according to claim 1, wherein the pre-printed images are color images.

3. The method according to claim 2, wherein at least one ink used to print the color images is fluorescent.

4. The method according to claim 1, wherein the postage indicia printer employs thermal printing to print the postage indicia on the roll of printing stock.

5. The method according to claim 1, wherein the first postage indicia printed on said roll of printing stock is for a first postage amount, and the second postage indicia printed on said roll of printing stock is for a second postage amount that is different from said first postage amount.

6. The method according to claim 1, wherein at least one of said pre-printed color images is different from at least one other of said pre-printed color images.

7. The method according to claim 1, further comprising:

printing, on the roll of printing stock, a return address of a user of the postage indicia printer.

8. The method according to claim 1, wherein, in response to a user selection, feeding the roll of printing stock such that a first one of said spaces passes a print head of the postage indicia printer without printing a postage indicium in said first one of said spaces is in response to a user selecting a desired one of said spaces using a collocated processor operatively connected to the value indicia printer.

* * * * *